United States Patent [19]

Weber

[11] Patent Number: 4,691,818

[45] Date of Patent: Sep. 8, 1987

[54] CONCEALED DRIVE COUPLING FOR USE WITH MODULAR SCREW CONVEYOR

[75] Inventor: Peter G. Weber, LaPlace, La.

[73] Assignee: The Laitram Corp., Harahan, La.

[21] Appl. No.: 822,641

[22] Filed: Jan. 27, 1986

[51] Int. Cl.$^4$ .............................................. B65G 33/32
[52] U.S. Cl. ................................... 197/666; 198/677; 403/292; 403/318
[58] Field of Search ............... 198/657, 662, 664, 666, 198/676, 677; 403/292, 298, 316, 318, 378, 379

[56] References Cited

U.S. PATENT DOCUMENTS

| | | | |
|---|---|---|---|
| 170,711 | 12/1875 | Chase | 198/677 |
| 368,182 | 8/1887 | Birkholz | 198/677 |
| 2,260,811 | 10/1941 | Kozak | 198/666 |
| 2,588,901 | 3/1952 | Weikart | 403/292 |
| 3,178,210 | 4/1965 | Dickinson | 198/666 |
| 3,272,317 | 9/1966 | Kelly | 198/666 |
| 3,289,819 | 12/1966 | Steinmetz | 198/666 |
| 3,705,644 | 12/1972 | Kawchitch | 198/664 |
| 4,448,564 | 5/1984 | Orszulak | 403/318 |

Primary Examiner—Joseph E. Valenza
Attorney, Agent, or Firm—James C. Kesterson

[57] ABSTRACT

A method and apparatus for coupling the drive shaft of an integrally molded modular screw conveyor is disclosed. A non-circular elongated drive shaft includes a non-circular axially extending aperture for receiving a first end of a coupling member having a corresponding size and shape such that rotation with respect to the shaft and coupling member is not possible. In addition, both the shaft and the coupling member define aligned recesses for receiving a locking pin so as to also prevent axially movement between the two. An integrally formed screw conveyor module includes an axially extending aperture with a size and cross-sectional shape for slideably receiving the drive shaft such that rotation is prevented between the drive shaft and the module. The locking pin is held in position by sliding the module over the locking pin when it is in place within the shaft and coupling member.

9 Claims, 12 Drawing Figures

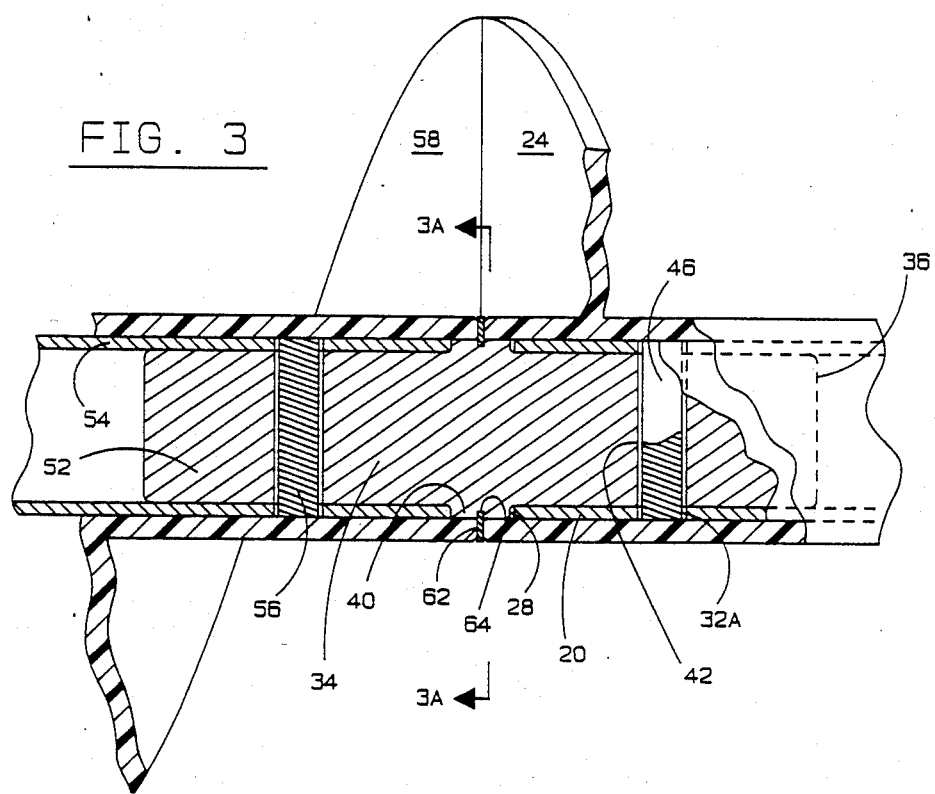
FIG. 3
FIG. 3A
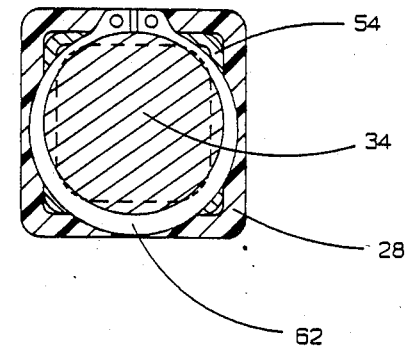
FIG. 7
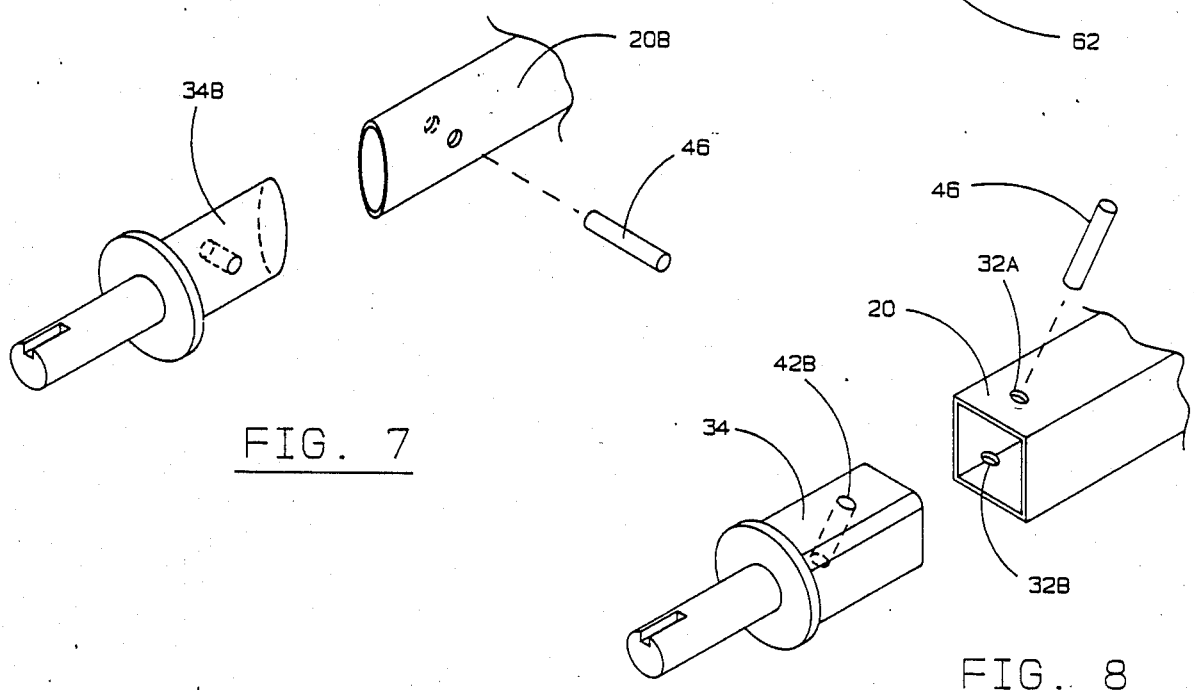
FIG. 8

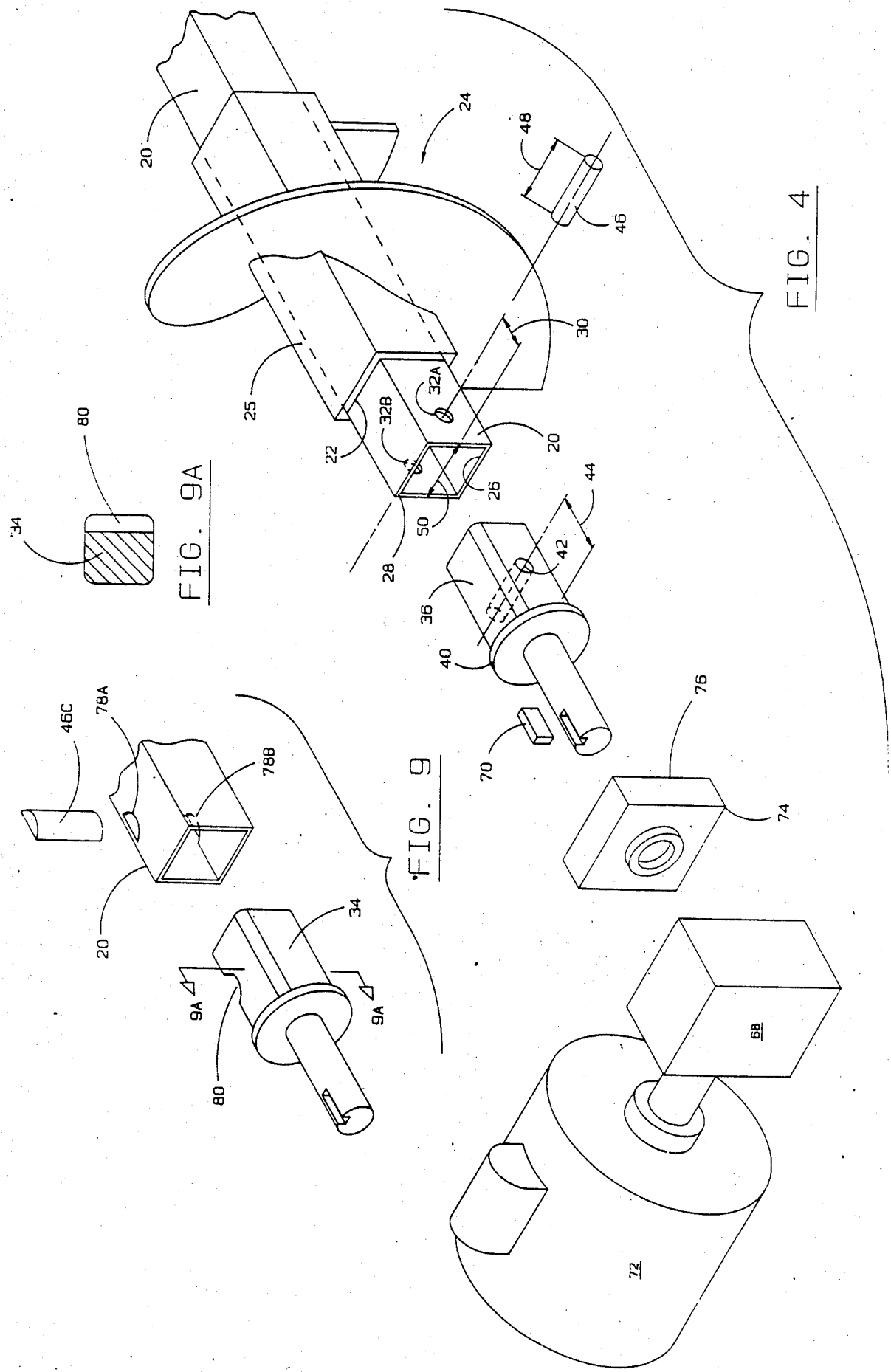

CONCEALED DRIVE COUPLING FOR USE WITH MODULAR SCREW CONVEYOR

TECHNICAL FIELD

This invention relates to a system for coupling the drive shaft of a screw conveyor, and more particularly to a concealed coupling joining the drive shaft of an integrally molded screw conveyor to a similar drive shaft or a drive source. The components of the coupling are protected and held in place by the integrally molded screw conveyor modules. The coupling requires no tool for assembly or disassembly, and once in place is completely enclosed and protected by the conveyor.

BACKGROUND ART

As will be appreciated by those skilled in the art, specialized helical shaped devices such as screw conveyors are well known for the transport of various types of bulk material. Such conveyors generally include a helical shaped member which rotates within a housing or trough such that rotation of the screw conveyor along its longitudinal or central axis results in movement of the bulk material along the length of the device. In the past, such conveyors were typically constructed from metal, and each conveyor was specifically designed for a particular purpose and of a particular length. However, although most prior art conveyors were specifically designed to meet a particular appication, there have been some attempts of providing a modular type conveyor of metal and wood. Examples of U.S. Patents which disclose such modular conveyors include U.S. Pat. No. 349,233 issued to James Nelson on Sept. 10, 1886; U.S. Pat. No. 455,384 issued to H. Binkholz on July 7, 1891; U.S. Pat. No. 525,194 issued to J. Dyson, et al on Aug. 20, 1894; U.S. Pat. No. 546,879 issued to J. Dyson, et al on Sept. 14, 1895; U.S. Pat. No. 1,867,573 issued to D. G. Leach on July 19, 1932; U.S. Pat. No. 2,492,915 issued to A. B. Carlson on Dec. 27, 1949; U.S. Pat. No. 3,648,826 issued to Dean P. Brooks on Mar. 14, 1972 and U.S. Pat. No. 3,705,644 issued to Claude E. Kawchitch on Dec. 12, 1972. However, a study of the above patents indicates that only the two Dyson, et al patents, the Nelson patent and the Kawchitch patent can be considered sectional or modular. In additional, the assignee of the present application filed on application for Letters Patent on Sept. 29, 1983 for a "Modular Screw Conveyor" and which has Ser. No. 537,345, and on Apr. 4, 1984 filed an application for "Mold and Process for Manufacturing helical Shaped Items" which has Ser. No. 598,374.

As will be appreciated, one of the advantages of the plastic modular screw conveyor is its ease of cleaning, etc. due to the smooth and non-interrupted surfaces. Also of course, by axially stacking any selected number of modules on the non-circular drive shaft a screw conveyor of any length can be fabricated. Of course, even though a multiplicity of a single type module can be used to manufacture screw conveyors of almost any length, until the present invention, the drive shaft had to be "cut to length" for each different screw conveyor. The requirement of such a "tailored" drive shaft was expecially true for certain applications wherein a joint or interruption in the screw conveyor to allow for joining two sections of a drive shaft simply could not be tolerated. In addition, for certain U.S.D.A. applications the assemblage of individual modules must be sealed to each other at their end surfaces to eliminate any cavities etc. which might harbor bacteria. For such applications, a one piece drive shaft was absolutely necessary no matter how long the screw conveyor, since shaft couplings available at that time which used sleeves and bolts were unacceptable and would not provide the uninterrupted and crevice-free surfaces.

Therefore, it is an object of the present invention to provide a drive shaft coupling which can be used with a multiple module screw conveyor.

It is another object of the present invention to provide a drive shaft coupling which is completely enclosed and protected by the screw conveyor modules.

It is yet another object to provide a drive shaft coupling which is inexpensive and easy to assemble and disassemble.

SUMMARY

These and other objects and advantages will be obvious and will in part appear hereinafter, and will be accomplished by the present invention which provides a concealed coupling for the drive system of an integrally formed modular screw conveyor. The concealed coupling system comprises a drive shaft which has a first and further end, and an outside perimeter defining a first non-circular cross-section. The drive shaft also defines an aperture of a non-circular cross-section which extends axially from the first end toward the further end, and in a typical embodiment may extend completely to the further end. The first end of the drive shaft defines a second aperture which extends from a first location on the perimeter, through the drive shaft and toward a second location on the perimeter. Typically, this second aperture may simply extend along a diameter through the drive shaft perpendicular to the longitudinal axis. An elongated coupling has a non-circular cross-sectional shape and size which is similar to the aperture extending through the drive shaft such that it is suitable for being received axially and slidably by the longitudinal aperture so as to join the drive shaft and the coupling means to prevent rotation between the two. The coupling means also defines a locking pin aperture which is located so as to be in register with the perpendicular aperture through the drive shaft when the coupling means is received by the drive shaft. A locking pin extends through the aperture from the first location in the drive shaft, into the locking pin aperture of the coupling means and then terminates at the aperture of the second location on the drive shaft. Typically, the locking pin will have a length substantially the same as the length of the aperture through the drive shaft. To hold the locking pin in place, an integrally formed screw conveyor module having an axially extending aperture of a cross-section suitable for receiving the drive shaft while preventing rotation therebetween is simply slid over the drive shaft so as to prevent movement of the locking pin out of the joined drive shaft and coupling means. The second end of the coupling means may cooperate in an identical manner with another drive shaft or a drive source. Thus, any number of drive shaft segments may be coupled to achieve a drive shaft of any desired length.

BRIEF DESCRIPTION OF THE DRAWINGS

The above features of the present invention will be more clearly understood from consideration of the following description in connection with the accompanying drawings in which;

FIG. 3 is a partial cross-sectional view similar to 2 except the individual screw conveyor modules do not seal the coupling and are held in position by retainer rings.

FIG. 3A is a sectional view taken along line 3A—3A of FIG. 3.

FIG. 4 is a perspective view similar to FIG. 1 showing means for coupling a rotating drive means to a drive shaft.

FIGS. 5, 6, 7, and 8 show exploded perspective views of couplings and drive shafts having various cross-section and locking pin arrangements.

FIG. 9 shows a side view of the coupling and drive shaft of FIG. 5 with still another locking pin arrangement.

FIG. 9A is a sectional view taken along line 9A—9A of FIG. 9.

BEST MODE OF CARRYING OUT THE APPLICATION

Figure 1:
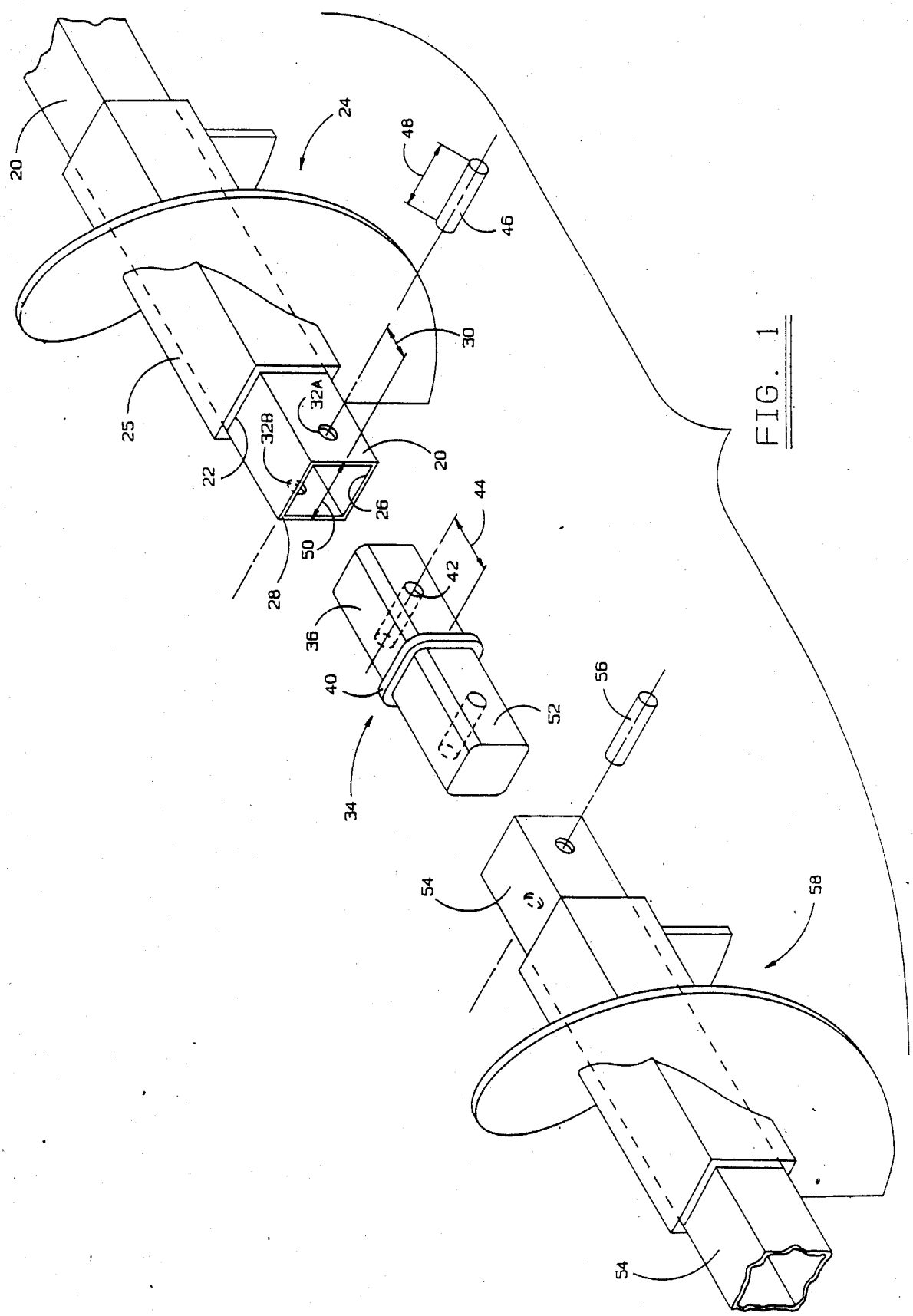
FIG. 1 is an exploded perspective view of a preferred embodiment of the coupling of this invention joining two drive shafts.

Referring now to FIG. 1, there is shown a perspective exploded view of the coupling system of this invention. As shown, a drive shaft 20 is suitable for being received in a non-circular aperture 22 of a screw conveyor module 24. Also, as shown, the perimeter of the drive shaft 20 has a outside cross-sectional area which is substantially the same as the cross-sectional area of the aperture through the axial member 25 of the screw conveyor module. It will be appreciated, however that although the outside perimeter of drive shaft 20 and the axial aperture of the screw conveying module 24 are substantially the same in the embodiment shown in FIG. 1, it would be possible to use a drive shaft which would cooperate with the aperture of the screw conveyor module but not have precisely the same shape. For example, the aperture of a module shown in the Kawchitch patent is not identical to a drive shaft which is received by the module. It can further be seen that the drive shaft 20 also defines a longitudinal or axial aperture 26 which extends from the first end 28 toward the second end of the drive shaft. Although typically the drive shaft 20 will be completely hollow and the aperture 26 will extend completely from one end to the other, it will be appreciated that the aperture 26 could extend a short distance along the longitudinal axis and the remainder of the drive shaft could be solid. Spaced a selected distance from the first end of drive shaft 20, and as indicated by double-headed arrow 30, there is a second aperture 32A–32B which is perpendicular to the longitudinal axis of the drive shaft and as shown extends perpendicular to the drive shaft. As can be seen, the aperture portion 32A defined by one of the four sides of the square shaped drive shaft 20 is in alignment with the second aperture portion 32B defined in an opposing side of the drive shaft.

Also as shown, a coupling means shown generally at 34 includes a first or connecting end 36 which has a shape suitable for being slidably received by aperture 26 of drive shaft 20. In the embodiment shown, the end 36 of coupling means 34 is generally of a square cross-sectional area similar to that of the aperture 26 cross-section except that the edges have been rounded off to allow for an easier fit. It will be appreciated of course that the end 36 could have an outside diameter cross-section which is precisely the same as that although slightly smaller than the aperture 26. Spaced from end 38 of connecting means 34 is a center band member 40. Also as shown, coupling means 34 defines an aperture 42 which is spaced from the center band member by a distance indicated by double-headed arrow 44 which distance is substantially the same as the distance indicated by double-headed arrow 30. Thus, it will be appreciated that when end 36 is located or positioned within aperture 26 of drive shaft 20, such that end 28 of the drive shaft is substantially in contact with center band member 40, aperture 42 is substantially in register with apertures 32A and 32B. It should be noted that aperture 42 is also located perpendicular to the longitudinal axis of coupling member 34 to achieve the in register position with the apertures 32A and 32B. Also as shown, aperture 42 has a diameter substantially the same as that of 32A and 32B. Thus, when the coupling member 34 is fully insrted within the drive shaft 20, and the aperture 42 is in register with apertures 32A and 32B, a locking pin 46 which has a diameter slightly smaller than the diameter of the apertures may be inserted in register apertures such that axial movement is prevented. It should also be noted, that the length indicated by double-arrow 48 of locking pin 46 is substantially identical to the width of the drive shaft 20 as indicated by double-headed arrow 50. It will also be appreciated of course that because of the cooperating shapes of end 36 of coupling means 34 and the aperture 26, rotational movement between the two is also prevented. Further, by simply sliding the screw conveyor module 24 forward such that end 28 of the module is also in contact with center ring 40 of the coupling device, it will be appreciated that locking pin 46 will be prevented from moving out of the apertures and thus the coupling is substantially enclosed and locked in place.

In the event that the drive shaft needs to be longer than that of drive shaft 20, a second drive shaft may be coupled to drive shaft 20 by coupling means 34 at end 52 of the coupling. Thus as shown, drive shaft 54 cooperates with coupling end 52 and pin 56 such that drive shaft 54 is also prevented from rotating with respect to the coupling. In a similar manner, screw conveyor module 58 slides over the drive shaft 54 to maintain locking pin 56 in position and thereby preventing disassembly. As shown in the partially sectioned fully assembled view of FIG. 2 and the cross-sectional view of 2A, the screw conveyor modules 24 and 58 may be bonded or sealed together as indicated by weld bead 60 such that the coupling assembly is completely enclosed and protected by the two sealed screw conveyor modules. In this arrangement, the metal drive shafts and couplings can be protected from corrosive materials. Further, in certain applications the Federal Government requires the absence of cavities and crevices which can harbor bacteria. Thus, by using the bead to seal the end sections and the ends of the flight, a continuous smooth and uninterrupted surface for conveying products requiring USDA approval can be achieved. It will also be appreciated, that it is not always necessary to include center band member 40 on coupling means 34 such that coupling means 34 has a constant cross-section. However, alignment of the locking pin apertures in the drive slots and the coupling means will be more difficult.

Figure 2:
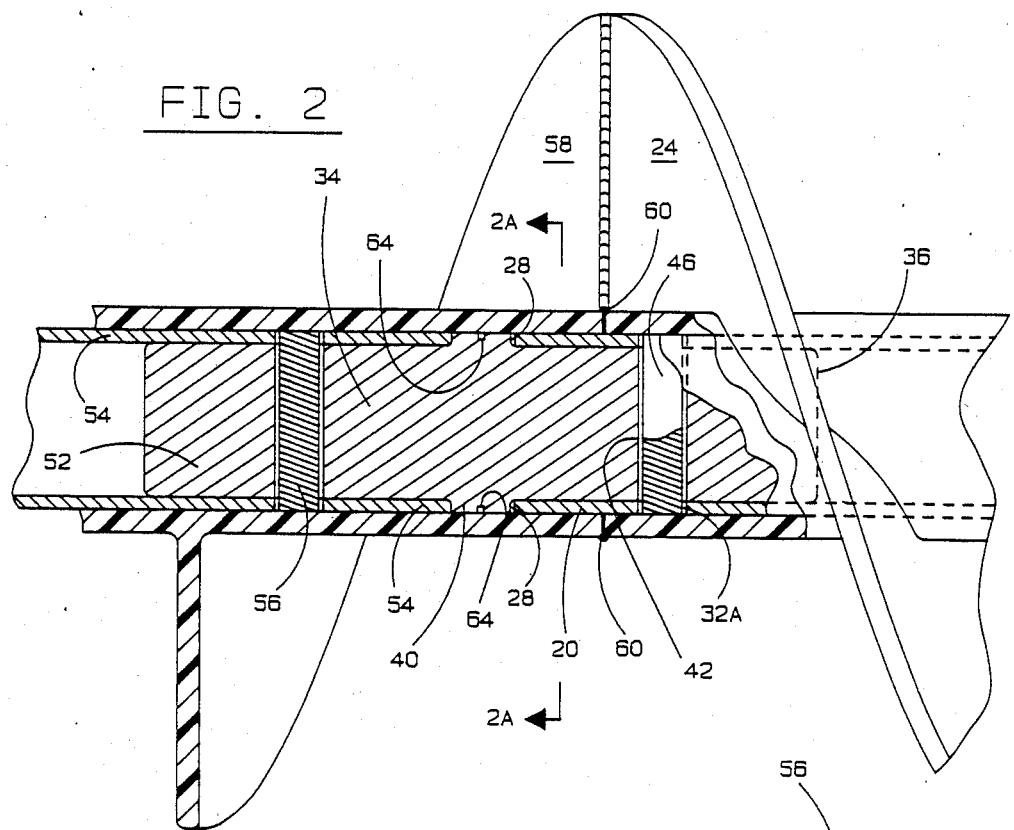
FIG. 2 is an assembled partial cross-sectional view of FIG. 1 showing a single drive shaft in cooperation with two screw conveyor modules bonded to each other so as to seal the coupling.
Figure 2A:
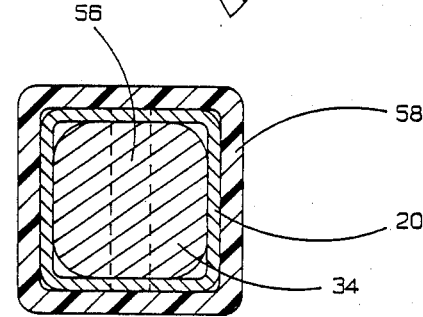
FIG. 2A is a sectional view taken along lines 2A—2A of FIG. 2.

Referring now to FIGS. 3 and 3A, there is shown a cross-sectional view similar to that of FIGS. 2 and 2A except the screw conveyor modules 24 and 58 are not bonded or sealed to each other. Furthermore, as shown a retainer ring such as a circle clip 62 is located in a groove 64 on center band member 40 to maintain the screw conveyor modules in position. It will be appreciated, of course, that the retainer ring may have a selected shape such as "square". In addition, means other than a retainer ring may be used.

Referring now to FIG. 4, there is shown a method of using the coupling system of this invention to couple a drive means to the drive shaft. As shown, common portions of the coupling system use similar reference numerals as those of FIG. 1. Also, as shown, the end 66 opposite end 36 of coupling means 34 may be a keyed round shaft suitable for being connected to a speed reduction box 68 by key 70. Reduction box 68 is in turn connected to a drive motor 72. It will be appreciated of course that instead of being connected to a drive motor by speed reduction box 68, the end 66 could have mounted thereon a pulley and be driven by a belt and the like. Also as shown and of importance with this invention, there is a plastic end cap 74 having a perimeter corresponding to the axial member 25 of screw conveyor module 24. End cap 74 has a contact edge 76 which is sealed or welded to the end 28 of the screw conveyor module 24 so as to further eliminate crevices etc. which could collect bacteria.

Figure 5:
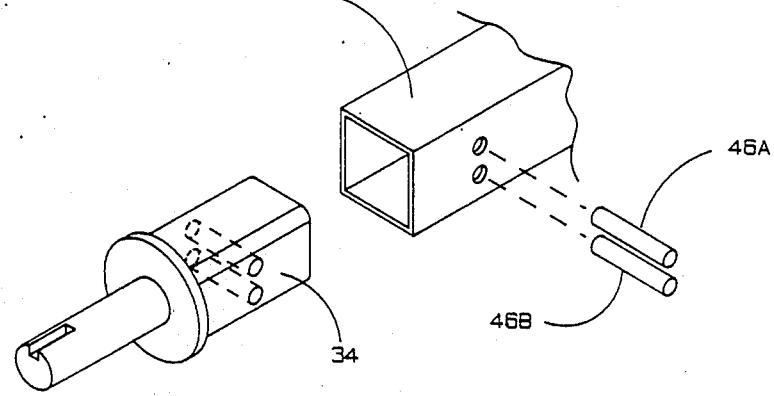
Figure 6:
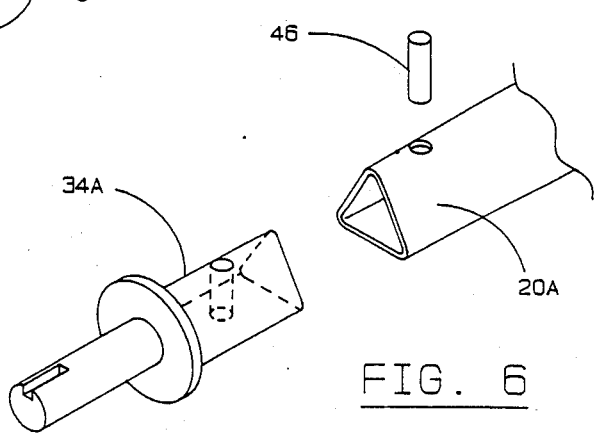

The use of a single pin 46 which extends through the substantially square cross-section drive shaft 20, and the coupling member 34 having partially square sides and which is held in position by a screw conveyor module 25 such as shown in FIG. 1 is believed to be a simple and perhaps preferred embodiment incorporating the features of this invention. However, FIGS. 5 through 9 show examples of other possible arrangements. For example, FIG. 5 shows an arrangement similar to that of FIG. 1 except two locking pins 46A and 46B are used. FIG. 6, shows a single locking pin 46. but the cross-sections of drive shaft 20A and coupling member 34A have a triangular shape rather than a square shape. In a similar manner, the cross-section of the drive shaft 20B and coupling member 34B of FIG. 7 is oval rather than square. In FIG. 8 the apertures 32A and 32B in the drive shaft 20 and the aperture 42B in coupling member 34 are at an angle rather than perpendicular through the center. The arrangement of FIG. 9 and 9A shows a semicircular locking pin 46C extending through semicircular apertures 78A and 78B in drive shaft 20, and a semicircular groove 80 in the side of the coupling member.

Thus, although there has been described to this point particular embodiments of the drive shaft coupling system for use with screw conveyor modules, it is not intended that such references be considered as limitations upon the scope of this invention except insofar as set forth in the following claims.

I claim:

1. A concealed drive coupling system for use with an integrally formed modular screw conveyor comprising:

an elongated drive shaft having a first and further end and an outside perimeter defining a first non-circular cross-section, said first end defining a first aperture extending axially from said first end toward said second end, said first aperture having a second non-circular cross-sectional shape and size, and said first end further defining a second aperture extending from a first location on said perimeter toward a second location on said perimeter;

coupling means having a connecting end and work end, said connecting end having a cross-sectional shape and size for cooperating with said second cross-sectional shape, and being axially and slidably received by said first aperture to join said drive shaft and said coupling means so as to prevent rotation therebetween, said coupling means defining a locking pin recess located in register with said second aperture when said coupling means is joined to said drive shaft;

a locking pin extending through said second aperture in said drive shaft and into said locking pin recess in said coupling means so as to prevent axial movement between said coupling means and said drive shaft; and an integrally formed screw conveyor module having an aperture therethrough extending aixally of said module, said aperture, having a size and cross-sectional shape for slidably receiving said first end of said drive shaft so as to prevent rotation therebetween and to prevent the removal of said locking pin.

2. The coupling of claim 1 wherein said working end is coupled to a rotating drive means.

3. The coupling of claim 1 wherein said working end of said coupling means has a size, a cross-section, defines an aperture, and cooperates with a second drive shaft, a second locking pin, and a second integrally formed module in the same manner as said connecting end.

4. The coupling of claims 1, 2 or 3 wherein said first aperture extends the full length of said elongated drive shaft.

5. The coupling of claims 1, 2 or 3 wherein said recess in said coupling means for receiving a locking pin is an aperture perpendicular to the longitudinal axis of said coupling means.

6. The coupling means of claims 1, 2 or 3 wherein said recess in said coupling means for receiving a locking pin as an aperture extending completely through said coupling means.

7. The coupling of claims 1, 2 or 3 wherein said recess in said coupling means for receiving a locking pin is an aperture perpendicular to the longitudinal axis of said coupling means and extends completely through said coupling means.

8. The coupling system of claims 1, 2 or 3 wherein said coupling means further defines a circumferential groove located between said connecting end and said working end for receiving a retaining ring so as to restrict axial movement of said drive shaft and said integrally formed screw modules with respect to said coupling means.

9. The coupling system of claims 1, 2 or 3 wherein said coupling means includes a center band member located intermediate said connecting end and said work end, said band member having a cross-sectional diameter greater than the cross-sectional diameter of said connecting end and said work end.

* * * * *